United States Patent
Ahmad et al.

(10) Patent No.: US 7,986,159 B1
(45) Date of Patent: Jul. 26, 2011

(54) METHOD AND APPARATUS FOR DETECTING A CABLE IN A REDRIVER

(75) Inventors: Jawaid Ahmad, Plano, TX (US); Matthew D. Rowley, Parker, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 12/838,226

(22) Filed: Jul. 16, 2010

(51) Int. Cl.
*H03K 19/003* (2006.01)
*H03K 19/173* (2006.01)
*H05K 7/10* (2006.01)

(52) U.S. Cl. .............................. 326/21; 326/38; 710/301

(58) Field of Classification Search .................... 326/37, 326/38, 21, 31; 710/100, 301–304
See application file for complete search history.

(56) References Cited

U.S. PATENT DOCUMENTS

| | | | |
|---|---|---|---|
| 6,906,549 B2 * | 6/2005 | Schoenborn et al. | 326/30 |
| 7,545,176 B2 * | 6/2009 | Agarwal et al. | 326/86 |
| 7,657,686 B2 * | 2/2010 | Paquette et al. | 710/302 |
| 7,859,299 B1 * | 12/2010 | Gay et al. | 326/30 |

* cited by examiner

*Primary Examiner* — James Cho
(74) *Attorney, Agent, or Firm* — John J. Patti; Wade J. Brady, III; Frederick J. Telecky, Jr.

(57) ABSTRACT

With conventional redrivers used for external Serial Advanced Technology Attachment (eSATA), there is no ability to indicated to a host that an external device (like a hard disk drive) is not present. As a result, power is consumed by a host because of nearly continual transmission of communication reset signals. Here, a redriver has been provided that includes a cable disconnect terminal and circuitry within a controller that is able to detect whether an external device is present. This redriver enables a host to be powered down or placed in a low power mode while also enabling the use an eSATA compliant connector.

16 Claims, 4 Drawing Sheets

METHOD AND APPARATUS FOR DETECTING A CABLE IN A REDRIVER

TECHNICAL FIELD

The invention relates generally to a redriver and, more particularly, to a redriver for a bus interface.

BACKGROUND

For the standards for Peripheral Component Interface Express (PCIe) version 2.7 (dated Jan. 15, 2007) and Universal Serial Bus (USB) version 3.0 (dated Nov. 17, 2008), each protocol provides seamless mechanisms to detect cable connections, which is accomplished through the use a receive or RX detect feature. However, the Serial Advanced Technology Attachment (SATA) revision 2.6 standard (which dated Mar. 7, 2007 and which is incorporated by reference for all purposes) does not specify any way to detect cable attachment or detachment for either cabled or socket applications. This deficiency poses a disadvantage for mobile applications (i.e., notebook personal computers (PCs)) that support an external-SATA (eSATA) port.

Turning to FIG. 1, an example of a conventional system 100 can be seen. System 100 generally comprises a host system 102 that communicates with an external device 104 (i.e., a hard disk drive) through a SATA compliant cable 106. To accomplish this, cable 106 is coupled to an external-SATA (eSATA) compliant connector 108, and a redriver 110 (such as the Texas Instruments Incorporated's SN75LVCP412) provides communications between connector 108 and SATA host 112 over communication link 114. With this configuration and when the external device 104 is disconnected or detached, host 112 continuously sends communication reset signals (or out-of-band signals) to initiate a response from the external device 104, which may be connected at any time. Needless to say, the nearly continuous transmission of the communication reset signals from the host can waste a considerable amount of power.

To address this solution, at least in part, the SN75LVCP412 from Texas Instruments Incorporated uses an Auto Low Power (ALP) Mode. In particular, this ALP mode is entered when there is not differential transaction or the link to the external device is in an electrical idle state. However, this redrive, like many other redrivers, only addresses power consumption by the redriver; the host may continue to use power through the transmission of communication reset signals. Therefore, there is a need for a method and/or apparatus that performs cable detection and reduces power consumption.

SUMMARY

A preferred embodiment of the present invention, accordingly, provides an apparatus. The apparatus comprises a first data terminal that is adapted to be coupled to an external device; a second data terminal that is adapted to be coupled to a host; a cable disconnect terminal that is adapted to be coupled to a host; a driver that is coupled to input terminal and the output terminal; a detector that is coupled to the driver; and a controller that is coupled to the detector and the cable disconnect terminal, wherein the controller determines whether the external device is coupled to the first data terminal, and wherein the controller issues a cable disconnect signal through the cable disconnect terminal to disable the host if the external device is not coupled to the first data terminal.

In accordance with a preferred embodiment of the present invention, the driver further comprises a first driver and wherein the controller further comprises: a first logic circuit that receives an open detect signal; a first delay line that is coupled to the first logic gate; a second delay line that is coupled to the first logic gate; a second logic circuit that is coupled to the first delay line and the second delay line, wherein the second logic circuit is clocked by the second delay line; a reset circuit that is coupled to the second logic circuit; and a second driver that is coupled to the second logic circuit and to the cable disconnect terminal.

In accordance with a preferred embodiment of the present invention, the first logic circuit is an AND-gate that receives the open detect signal and an enable signal.

In accordance with a preferred embodiment of the present invention, the second logic circuit is a D-flip-flop having an input terminal, a clock terminal, and a preset terminal, wherein the input terminal of the D flip-flop is coupled to the first delay line, and wherein the clock terminal is coupled to the second delay line, and wherein the pre-set terminal is coupled to the reset circuit.

In accordance with a preferred embodiment of the present invention, the second delay line further comprises a plurality of inverters coupled in series with one another.

In accordance with a preferred embodiment of the present invention, the first delay line further comprises an inverter.

In accordance with a preferred embodiment of the present invention, the reset circuit further comprises: a timer that receives a power-on-reset signal; a third logic circuit that receives the enable signal and a preset signal and that is coupled to the timer; a third delay line that is coupled to the third logic circuit; a fourth logic circuit that receives a return signal and the preset signal; a fifth logic circuit that is coupled to the third delay line and the third logic circuit; and a sixth logic circuit that is coupled to the is coupled to the fourth logic circuit, the fifth logic circuit, and the preset terminal of the D flip-flop.

In accordance with a preferred embodiment of the present invention, the AND-gate further comprises a first AND-gate, wherein the first and second terminals are differential, and wherein the apparatus further comprises an equalizer that is coupled between the first terminal and the driver, and wherein the third logic circuit further comprises a NAND-gate, and wherein the fourth logic circuit further comprises a second AND-gate, and wherein the fifth logic circuit further comprises and OR-gate, and wherein the sixth logic circuit further comprises a third AND-gate.

In accordance with a preferred embodiment of the present invention, an apparatus is provided. The apparatus comprises a host; a connector that is adapted to be coupled to an external device; and a redriver having: a first pair of differential data terminals that are coupled to the connector; a second pair of differential data terminals that are coupled to the host; a third pair of differential data terminals that are coupled to the connector; a fourth pair of differential data terminals that are coupled to the host; a cable disconnect terminal that coupled to the host; a first equalizer that is coupled to the second pair of differential input terminals; a first driver that is coupled to the first equalizer and the first pair of differential input terminals; a second equalizer that is coupled to the third pair of differential input terminals; a second driver that is coupled to the second equalizer and the fourth pair of differential input terminals; a first detector that is coupled to the first driver; a second detector that is coupled to the second driver; and a controller that is coupled to the detector and the cable disconnect terminal, wherein the controller determines whether the external device is coupled to the first data terminal, and wherein the controller issues a cable disconnect signal through the cable disconnect terminal to disable the host if the external device is not coupled to the first data terminal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
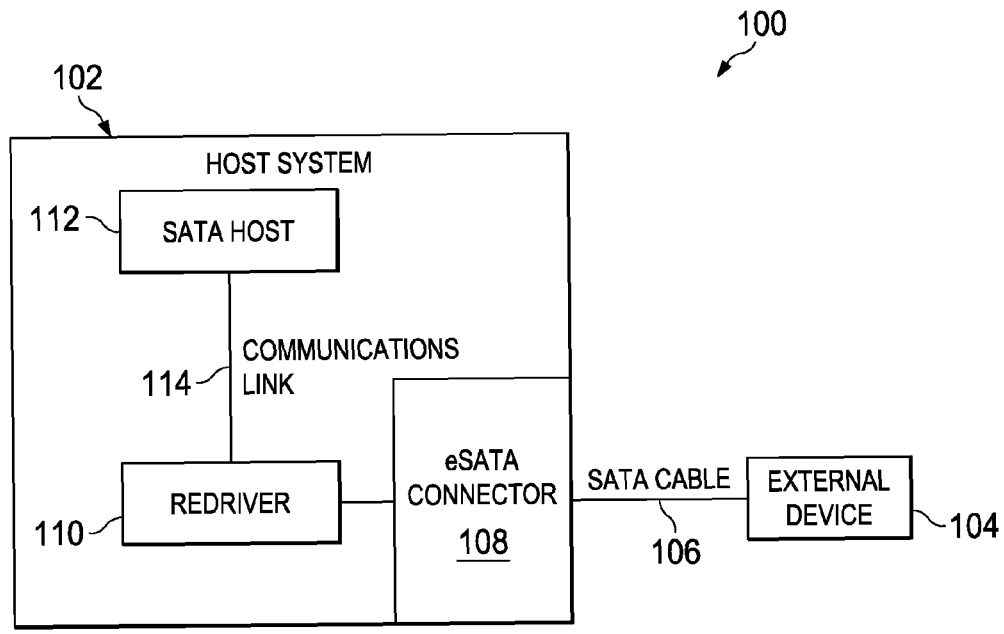
FIG. 1 is a block diagram of a conventional system.

Refer now to the drawings wherein depicted elements are, for the sake of clarity, not necessarily shown to scale and wherein like or similar elements are designated by the same reference numeral through the several views.

Figure 2:
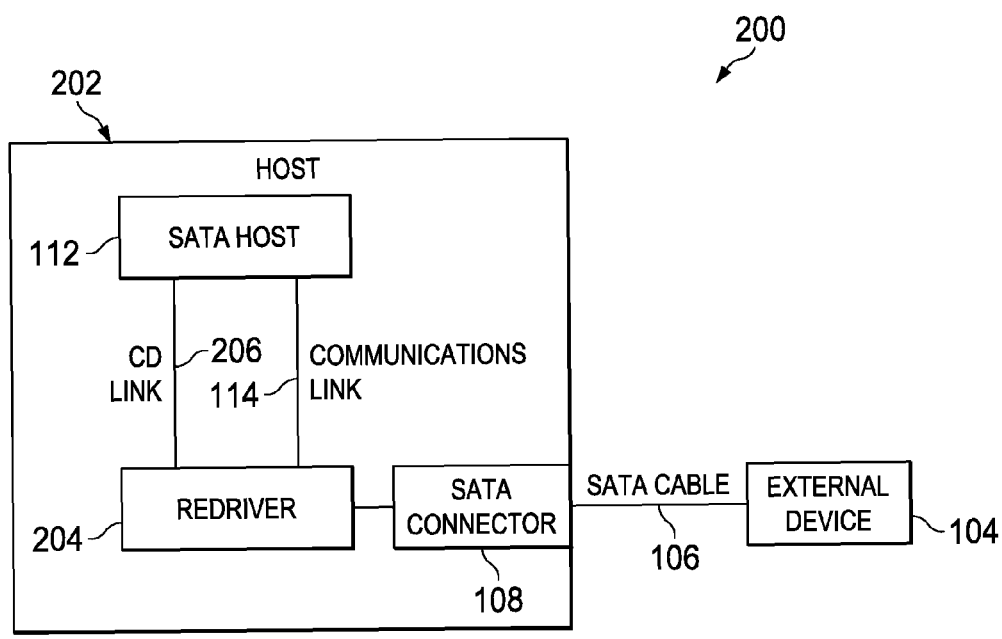
FIG. 2 is a block diagram of an example of system in accordance with a preferred embodiment of the present invention.
Figure 3:
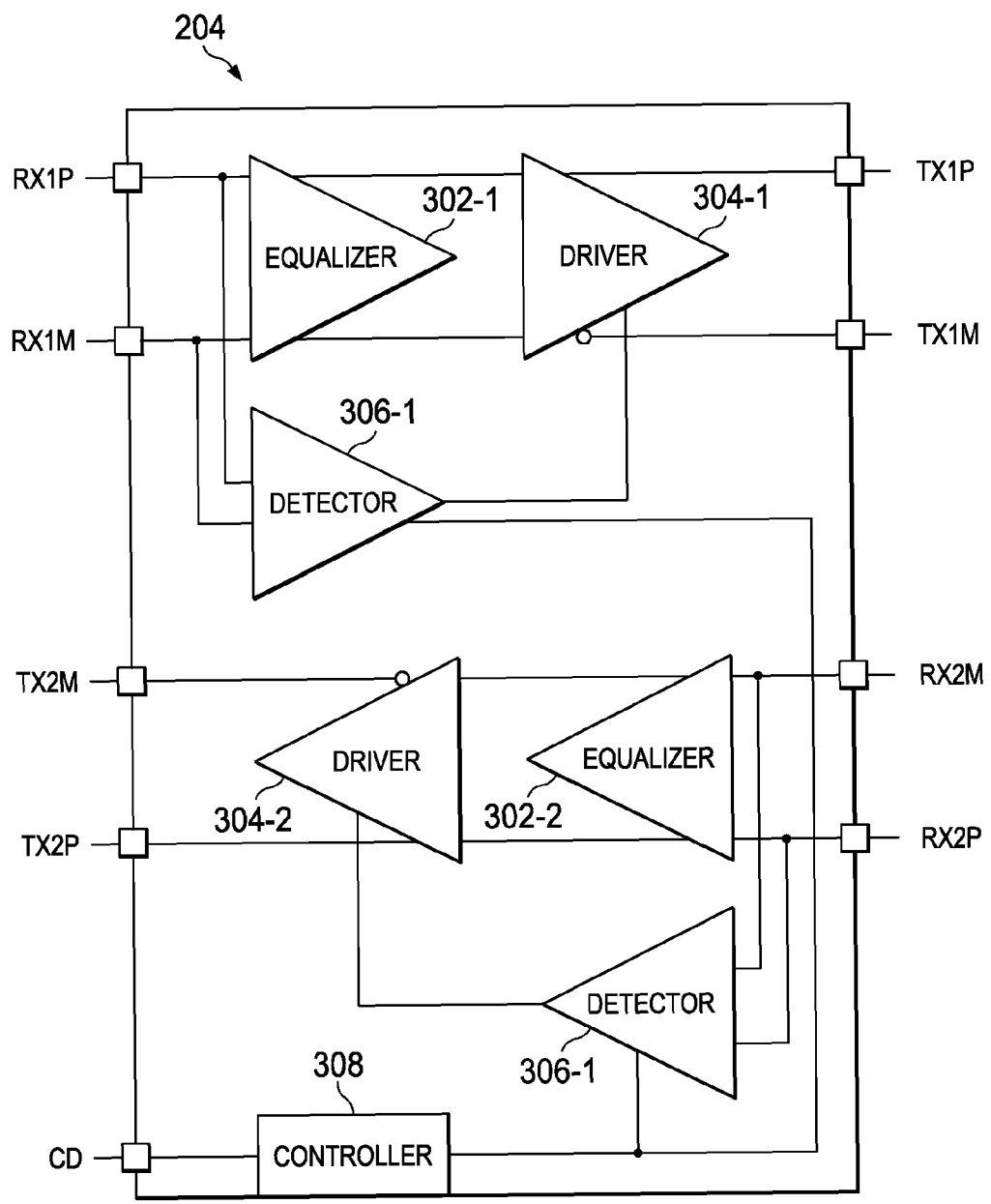
FIG. 3 is a block diagram of an example of the redriver of FIG. 2.
Figure 4:
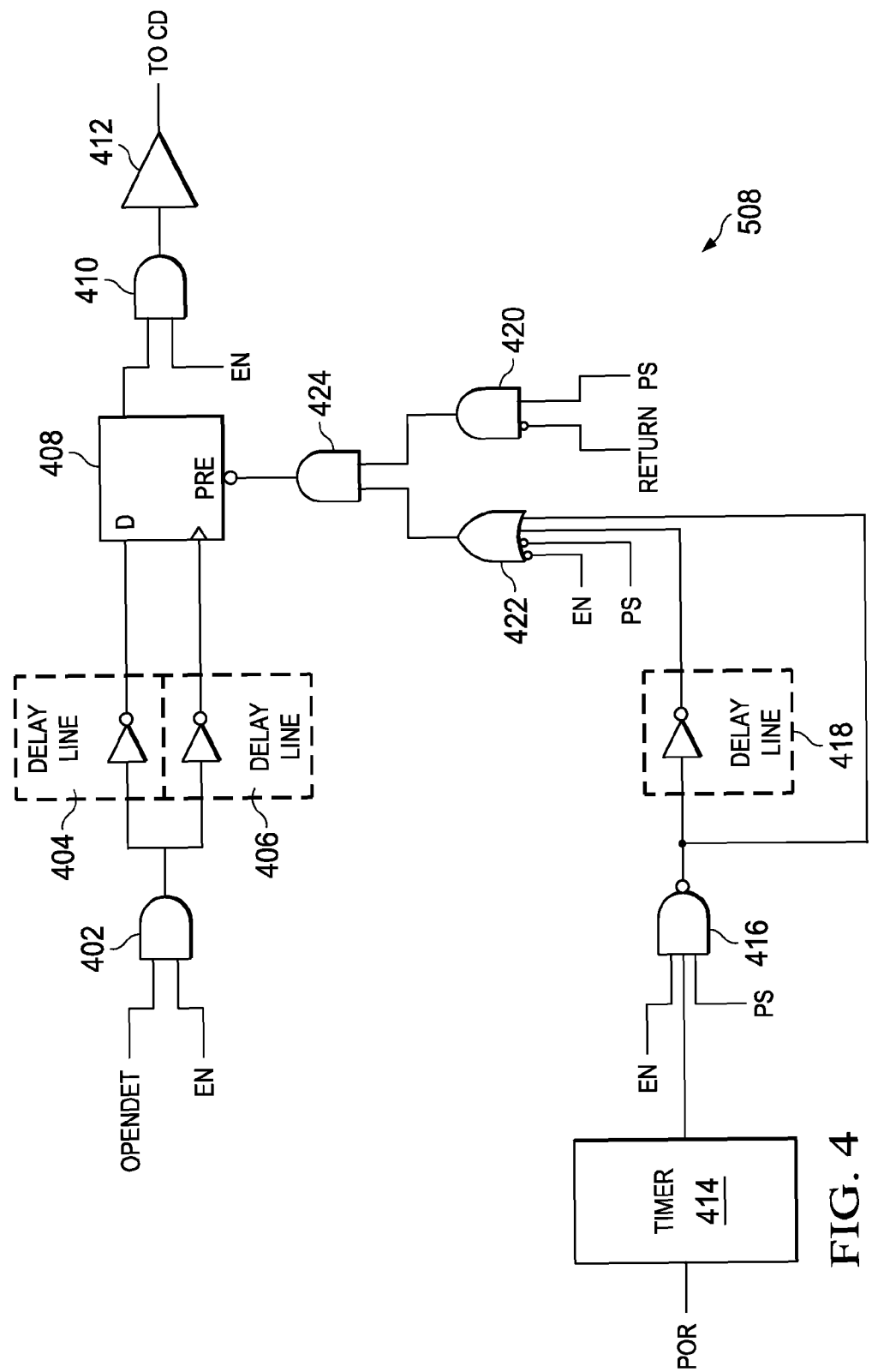
FIG. 4 is a block diagram of a portion of the controller of FIG. 3.

Turning to FIGS. 2-4, a system 200 in accordance with a preferred embodiment of the present invention can be seen. System 200 is similar to system 100, except that host 202 includes a redriver 204, which is able to provide a cable disconnect signal over cable disconnect link 204. The redriver 204 generally comprises a two channel SATA (rev. 2.6) compliant redriver that supports data rates up to 3.0 Gbps. Each of the channels of the redriver 204 generally comprises a pair of differential input terminals RX1P/RX1M or RX2P/RX2M, a pair of differential output terminals TX1P/TX1M or TX2P/TX2M, an equalizer 302-1 or 302-2, a driver 304-1 or 304-2, a detector 306-1 or 306-2, and a controller 308. Using the first channel as an example, in operation, a signal is received through its input terminals RX1P/RX1M, equalized by equalizer 302-1, and driven by driver 304-1. Additionally, for the first channel, detector 306-1 (which operates as a return squelch detector) enables full detection of out-of-bounds signals (i.e., amplitude of the received signal is lower than a predetermined threshold).

Of interest, however, is the controller 308. Controller 308 is able to determine whether external device 104 is coupled to connector 108, and when there is no connection present, the controller 308 can issue a cable disconnect signal through the cable disconnect terminal CD (which is generally coupled to the cable disconnect link 206). To accomplish this, controller 308 preferably uses a D flip-flop 408, an AND-gate 410, and driver 412, where the flip-flop is generally controlled by an input circuit and a reset circuit. The input circuit generally comprises an AND-gate 402 that receives an enable signal EN and an internal cable disconnect signal OPENDET (which can be provided detector 306-1 or 306-2) and delay lines 404 and 406. Typically, delay line 404 (which generally comprises an inverter) provides a signal to the D or input terminal of flip-flop 408, while delay line (which generally comprises a several inverters coupled in series with one another and which is generally longer than delay line 406) provides a clocking signal to the clocking input of flip-flop 408. The reset circuit generally comprises a timer 414 (which is about 10 ms and that receives a power-on reset signal POR), an NAND-gate 416 (which is coupled to the timer 414 and receives the enable signal EN and preset signal PS), delay line 408 (which generally comprises a several inverters coupled in series with one another), an AND-gate 420 (which receives an inverted squelch return signal RETURN and the preset signal PS), an OR-gate 422 (which is coupled to NAND-gate 416 and delay line 418 and receive an inverted enable signal EN and an inverter preset signal PS), and AND-gate 424 (which is coupled to OR-gate 422, AND-gate 420, and the preset terminal of flip-flop 408).

When the internal cable disconnect signal OPENDET transmitted to controller 308 is logic high or "1" (and the enable signal EN is logic high or "1"), AND-gate 402 outputs a "1" to delay lines 404 and 406. Because delay line 404 is typically shorter than delay line 406, the output from AND-gate 402 transmitted through delay line 404 reaches the D flip-flop 408 prior to the output from AND-gate 402 transmitted through delay line 406. Once the output from AND-gate 402 transmitted through delay line 406 reaches the flip-flop 408, a logic high or "1" is output to AND-gate 410, and since the enable signal EN is "1", AND-gate 410 outputs a "1." This output from AND-gate 410 is driven by driver 412 and is provided to terminal CD. This "1" presented at terminal CD reflects a detection that external device 104 is not present or the link is idled.

Figure 5:
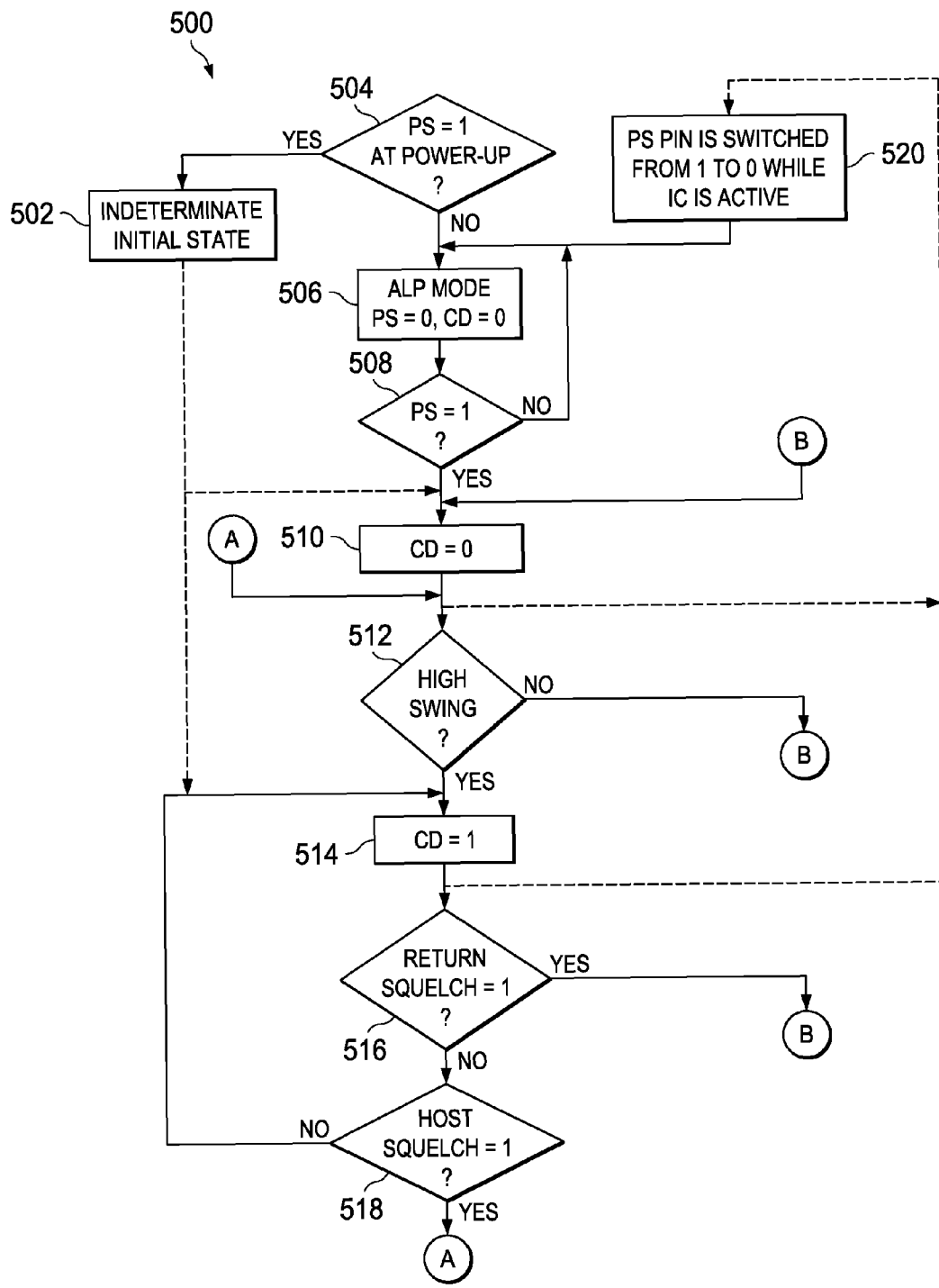
FIG. 5 is a flow chart depicting an example of at least a portion of the operation of the redriver of FIG. 2.

Turning now to FIG. 5, a flow chart depicting a least a portion of the operation of redriver 204 can be seen. At power-up, a determination is made in step 504 as to whether the preset signal PS (which is generally provided through a preset terminal) is "1", which indicates whether the cable detect is active. If the preset signal PS is "0" (cable is inactive), then the redriver 204 enters an ALP mode in step 506. Alternatively, if the preset signal PS is "1" (cable is active) at power-up, then redriver 204 enters an indeterminate state in step 502, where the terminal CD can present a "1" (step 510) or a "0" (step 514). From this indeterminate state, the present signal PS (and its corresponding terminal) are switched to "0" in step 520, while the redriver 204 (which is generally an integrated circuit or IC) is active, so that the redriver 204 can enter the ALP mode in step 506. With the redriver 204 in ALP mode, there is periodic checking in step 508 to determine whether the present signal PS is "1." Once the preset signal PS is "1," terminal CD is set to present a "0" in step 510. When terminal CD has been adjusted to present a "0" and external device 104 is present, the initial state is correct, but if terminal CD has been adjusted to present a "0" and external device 104 is missing, then the state is corrected in step 514 by setting terminal CD to present a "1" when a high swing is detected (chirp detect circuit that is generally included in controller 308 determines there is a missing load) in step 512. If terminal CD is "1" and an external device 114 is present, terminal CD is set to present a "0" in step 510, and when the return squelch circuit (generally included in detectors 306-1 and 306-2) sets the return signal RETURN to present a "1" in step 516 or when the host transmits a signal in step 518 and a high swing is detected in step 512.

As a result, several advantages can be realized. Redriver 204 uses an eSATA (rev. 2.6) compliant connector without the need for any special, non-compliant adapters. Also, redriver 204 enables host 112 to be powered down or placed in a low power mode so as to reduce power consumption, which can be particularly advantageous for mobile applications where battery life can be extended.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    a first data terminal that is adapted to be coupled to an external device;
    a second data terminal that is adapted to be coupled to a host;
    a cable disconnect terminal that is adapted to be coupled to the host;
    a driver that is coupled to an input terminal and an output terminal;
    a detector that is coupled to the driver; and
    a controller that is coupled to the detector and the cable disconnect terminal, wherein the controller determines whether the external device is coupled to the first data terminal, and wherein the controller issues a cable disconnect signal through the cable disconnect terminal to disable the host if the external device is not coupled to the first data terminal.

2. The apparatus of claim 1, wherein the driver further comprises a first driver and wherein the controller further comprises:
    a first logic circuit that receives an open detect signal;
    a first delay line that is coupled to the first logic circuit;
    a second delay line that is coupled to the first logic circuit;
    a second logic circuit that is coupled to the first delay line and the second delay line, wherein the second logic circuit is clocked by the second delay line;
    a reset circuit that is coupled to the second logic circuit; and
    a second driver that is coupled to the second logic circuit and to the cable disconnect terminal.

3. The apparatus of claim 2, wherein the first logic circuit is an AND-gate that receives the open detect signal and an enable signal.

4. The apparatus of claim 3, wherein the second logic circuit is a D-flip-flop having an input terminal, a clock terminal, and a preset terminal, wherein the input terminal of the D flip-flop is coupled to the first delay line, and wherein the clock terminal is coupled to the second delay line, and wherein the pre-set terminal is coupled to the reset circuit.

5. The apparatus of claim 4, wherein the second delay line further comprises a plurality of inverters coupled in series with one another.

6. The apparatus of claim 5, wherein the first delay line further comprises an inverter.

7. The apparatus of claim 6, wherein the reset circuit further comprises:
    a timer that receives a power-on-reset signal;
    a third logic circuit that receives the enable signal and a preset signal and that is coupled to the timer;
    a third delay line that is coupled to the third logic circuit;
    a fourth logic circuit that receives a return signal and the preset signal;
    a fifth logic circuit that is coupled to the third delay line and the third logic circuit; and
    a sixth logic circuit that is coupled to the is coupled to the fourth logic circuit, the fifth logic circuit, and the preset terminal of the D flip-flop.

8. The apparatus of claim 7, wherein the AND-gate further comprises a first AND-gate, wherein the first and second terminals are differential, and wherein the apparatus further comprises an equalizer that is coupled between the first terminal and the driver, and wherein the third logic circuit further comprises a NAND-gate, and wherein the fourth logic circuit further comprises a second AND-gate, and wherein the fifth logic circuit further comprises and OR-gate, and wherein the sixth logic circuit further comprises a third AND-gate.

9. An apparatus comprising:
    a host;
    a connector that is adapted to be coupled to an external device; and
    a redriver having:
        a first pair of differential data terminals that are coupled to the connector;
        a second pair of differential data terminals that are coupled to the host;
        a third pair of differential data terminals that are coupled to the connector;
        a fourth pair of differential data terminals that are coupled to the host;
        a cable disconnect terminal that coupled to the host;
        a first equalizer that is coupled to the second pair of differential data terminals;
        a first driver that is coupled to the first equalizer and the first pair of differential data terminals;
        a second equalizer that is coupled to the third pair of differential data terminals;
        a second driver that is coupled to the second equalizer and the fourth pair of differential input terminals;
        a first detector that is coupled to the first driver;
        a second detector that is coupled to the second driver; and
        a controller that is coupled to the detector and the cable disconnect terminal, wherein the controller determines whether the external device is coupled to the first differential data terminal, and wherein the controller issues a cable disconnect signal through the cable disconnect terminal to disable the host if the external device is not coupled to the first differential data terminal.

10. The apparatus of claim 9, wherein the driver further comprises a first driver and wherein the controller further comprises:
    a first logic circuit that receives an open detect signal;
    a first delay line that is coupled to the first logic circuit;
    a second delay line that is coupled to the first logic circuit;
    a second logic circuit that is coupled to the first delay line and the second delay line, wherein the second logic circuit is clocked by the second delay line;
    a reset circuit that is coupled to the second logic circuit; and
    a second driver that is coupled to the second logic circuit and to the cable disconnect terminal.

11. The apparatus of claim 10, wherein the first logic circuit is an AND-gate that receives the open detect signal and an enable signal.

12. The apparatus of claim 11, wherein the second logic circuit is a D-flip-flop having an input terminal, a clock terminal, and a preset terminal, wherein the input terminal of the D flip-flop is coupled to the first delay line, and wherein the clock terminal is coupled to the second delay line, and wherein preset terminal is coupled to the reset circuit.

13. The apparatus of claim 12, wherein the second delay line further comprises a plurality of inverters coupled in series with one another.

14. The apparatus of claim 13, wherein the first delay line further comprises an inverter.

15. The apparatus of claim 14, wherein the reset circuit further comprises:
 a timer that receives a power-on-reset signal;
 a third logic circuit that receives the enable signal and a preset signal and that is coupled to the timer;
 a third delay line that is coupled to the third logic circuit;
 a fourth logic circuit that receives a return signal and the preset signal;
 a fifth logic circuit that is coupled to the third delay line and the third logic circuit; and
 a sixth logic circuit that is coupled to the is coupled to the fourth logic circuit, the fifth logic circuit, and the preset terminal of the D flip-flop.

16. The apparatus of claim 15, wherein the AND-gate further comprises a first AND-gate, and wherein the third logic circuit further comprises a NAND-gate, and wherein the fourth logic circuit further comprises a second AND-gate, and wherein the fifth logic circuit further comprises and OR-gate, and wherein the sixth logic circuit further comprises a third AND-gate.

* * * * *